US006994646B2

(12) United States Patent
Ai

(10) Patent No.: US 6,994,646 B2
(45) Date of Patent: Feb. 7, 2006

(54) ELECTRO-MECHANICAL INFINITELY VARIABLE TRANSMISSION

(75) Inventor: Xiaolan Ai, Massillon, OH (US)

(73) Assignee: The Timken Company, Canton, OH (US)

( * ) Notice: Subject to any disclaimer, the term of this patent is extended or adjusted under 35 U.S.C. 154(b) by 141 days.

(21) Appl. No.: 10/451,303

(22) PCT Filed: Oct. 15, 2002

(86) PCT No.: PCT/US02/32982

§ 371 (c)(1), (2), (4) Date: Jun. 19, 2003

(87) PCT Pub. No.: WO03/035421

PCT Pub. Date: May 1, 2003

(65) Prior Publication Data

US 2004/0043856 A1 Mar. 4, 2004

Related U.S. Application Data

(60) Provisional application No. 60/343,336, filed on Oct. 22, 2001.

(51) Int. Cl.
*F16H 3/72* (2006.01)

(52) U.S. Cl. .......................................................... 475/5

(58) Field of Classification Search ................. 475/317, 475/330, 5, 311; 180/65.1–65.3; 477/3, 5
See application file for complete search history.

(56) References Cited

U.S. PATENT DOCUMENTS

| | | | | |
|---|---|---|---|---|
| 3,982,448 A | | 9/1976 | Polak et al. | |
| 5,513,719 A | | 5/1996 | Moroto et al. | |
| 5,558,588 A | | 9/1996 | Schmidt | |
| 5,558,595 A | | 9/1996 | Schmidt et al. | |
| 5,603,671 A | * | 2/1997 | Schmidt | 475/5 |
| 5,730,676 A | * | 3/1998 | Schmidt | 475/5 |
| 5,907,191 A | | 5/1999 | Sasaki et al. | |
| 5,914,575 A | | 6/1999 | Sasaki | |
| 5,920,160 A | | 7/1999 | Yamada et al. | |
| 5,931,757 A | * | 8/1999 | Schmidt | 475/5 |
| 5,935,035 A | * | 8/1999 | Schmidt | 475/5 |
| 5,947,855 A | | 9/1999 | Weiss | |
| 5,991,683 A | | 11/1999 | Takaoka et al. | |
| 6,478,705 B1 | * | 11/2002 | Holmes et al. | 475/5 |
| 6,551,208 B1 | * | 4/2003 | Holmes et al. | 475/5 |
| 6,595,884 B1 | * | 7/2003 | Ai et al. | 475/5 |
| 2002/0061802 A1 | * | 5/2002 | Chung | 475/5 |
| 2004/0092353 A1 | * | 5/2004 | Moeller | 475/5 |

FOREIGN PATENT DOCUMENTS

| | | |
|---|---|---|
| EP | 829386 | 12/1998 |
| JP | 343964 | 4/1999 |

* cited by examiner

*Primary Examiner*—Roger Pang
(74) *Attorney, Agent, or Firm*—Pōlster, Lieder, Woodruff & Lucchesi

(57) ABSTRACT

An electro-mechanical vehicle power transmission (10) comprises two planetary trains (12, 14) defining mechanical pathways, two electric machines (20, 22) defining an electrical pathway, and at least one torque transfer device (24) that can selectively couple between one component and another component or components to transfer torque. Each planetary train includes a sun member (12A, 14A), a ring member (12B, 14B), and a plurality of planet members (12C, 14C) engaged with the ring member and the sun member. Each planetary train includes a planet carrier (12D, 14D) configured to hold the planet members in an annular space between the ring member and the sun members. Each electric machine can be operated either as a motor to covert electrical energy to mechanical energy or as a generator to convert mechanic energy to electric energy. A first external coupler (16) receives mechanical power from a prime mover while a concentrically disposed second external coupler (18) delivers mechanical power to a driven member.

16 Claims, 8 Drawing Sheets

ELECTRO-MECHANICAL INFINITELY VARIABLE TRANSMISSION

CROSS REFERENCE TO RELATED APPLICATIONS

This application claims priority to U.S. Provisional Application Ser. No. 60/343,336 filed on Oct. 22, 2001, herein incorpated by reference.

TECHNICAL FIELD

The present invention relates generally to a vehicle power transmission, and in particular, to a vehicle power transmission which blends the features of a series-hybrid transmission configuration, a parallel-hybrid transmission configuration, a pure electric drive transmission, and a pure mechanical drive transmission over the entire speed range of the vehicle, leveraging the benefits of the series-hybrid configuration and pure electric drive transmissions during slow speed operation and the benefits of the parallel-hybrid configuration and pure mechanical drive transmissions during high-speed operation.

BACKGROUND ART

A vehicle power transmission is an important part of a vehicle power train. The primary function of a vehicle power transmission is to regulate vehicle speed and torque delivered to the driven wheels from a driving engine to meet operator demands for speed and acceleration. The major requirements for vehicle power transmissions are speed ratio ranges, torque capacity, transmission and system efficiencies, weight, and cost.

There are two types of conventional vehicle power transmissions: stepwise and step-less. Stepwise transmissions, using multiple gear sets and clutching devices, are quite popular. The speed ratio changes are accomplished in discrete steps by engaging different gears in the power transmission pathway. Speed ratio changes are often associated with interruptions in both speed and torque. The output speed variation between two speed ratios is realized by varying the input speed supplied by the driving engine. A major disadvantage of a stepwise vehicle power transmission is system efficiency, since the engine cannot always operate at its most efficiency speed. For the same reason, pollution is also a problem for a vehicle with a stepwise power transmission.

Step-less transmissions provide a continuously variable speed ratio change. With a step-less transmission, it is possible to operate a driving engine at an optimal speed and, therefore, keep the engine at its peak efficiency. Common types of step-less transmissions include hydrostatic drives and friction drives or traction drives (i.e. toroidal drives, belt drive continuously variable transmissions (CVTs)).

Hydrostatic traction drives have several drawbacks. The hydrostatic traction drives are noisy and have low efficiency, and as such, they generally are used only for low speed applications such as agriculture machines and construction equipment. Traction drives are more efficient, but they are less rugged for handling large torque loads. Overall, many traction drives are usually quite heavy and costly to manufacture.

Recent developments in step-less transmissions has been in the area of electro-mechanical transmissions, such as European Granted Patent No. EP 0755818 B1 and Tenberge, P., (1999), "Electric-Mechanical Hybrid Transmission," Proc. International Congress on Continuously Variable Power Transmission, Eindhoven University of Technology (hereinafter "Tenberge").

Most of the newly proposed electro-mechanical transmissions operate on a power-split concept historically developed for hydrostatic drives. In a power-split transmission, there exists multiple parallel power paths. There are two basic power-splitting devices, a single planetary unit and a compounded planetary unit that comprises two nested subplanetary sets. When properly connected with two electric machines, a single planetary electro-mechanical transmission is capable of producing at least one point in speed ratio where no power is passing through the electric machines and all power transmitted is passing through a mechanical path. This point is referred to as the mechanical node point. For an electro-mechanical transimssion there is no energy conversion at the mechanical node point from mechanical form to electric form and back to mechanical form. Thus, the transmission yields the maximum efficiency. An electro-mechanical transmission with a single planetary train is called single node system. An example of such a system is the Toyota Hybrid System now in limited production.

However, as the output-to-input speed ratio of the transmission moves away from the node point, the power to the electric machines in a single-node system increases significantly. The power that is circulated between the two electric machines can far exceed the power that the transmission is transmitting. Such internal power circulation occurs at speed ratios either above the node point when one motor is connected to the output shaft or below the node point when one motor is connected to the input shaft. Internal power circulation generates heat and power loss and offsets the efficiency benefit otherwise provided by the transmission. For this reason, the effective speed ratio range is limited. To cover a useful speed ratio range, oversized electric machines are often used.

To reduce or restrict internal power circulation, sophisticated control systems were developed for the Toyota Hybrid System. These control systems monitor the torque value of the electric motor and shift the driving engine to another driving point of higher speed. In other words, the control system limits the output-to-input speed ratio to the node point or slightly above.

In contrast to a single-node system, an electro-mechanical transmission with a compound planetary unit is considered a two node system which contains four branches. When two of its four branches are connected to two electric machines, it can produce at least two mechanical node points where no electric power is passing from the input of the transmission to the output through the electric machines. As with single planetary unit, a two-node system also suffers from the internal power circulation problem. Internal power circulation occurs outside the two node points, below the first node point or above the second node point. But in general, a two-node system has a wider speed ratio range than a single node system.

To extend the speed ratio range and overcome excessive internal power circulation, multi-regime (also called multimode) infinitely variable transmissions, analogous to speed ratio shifting in stepwise transmissions, have been proposed.

Various configurations of variable, two-mode, power split, parallel, hybrid electric transmissions are also known. They all employ at least a compound planetary set along with other gears and shifting devices and two electric machines. The two-mode design provides adequate speed ratio range where the first mode covers slow vehicle speed operation and the second mode covers relatively high-speed operation. The mode shifting in a two-mode design is achieved through the use of clutches and synchronized gear sets, resulting in a complex design.

In the first mode, there exists a pure mechanical node point. In the second mode, there are two mechanical node points. At each mechanical node point, there is no energy conversion from mechanical form to electric form and back to mechanical form. Thus, the transmission operates at maximum efficiency.

Away from the node points, the power to the electric machines increases. In fact, the power to electric machines increases rapidly as the vehicle's speed drops below the first node point in the second mode operation. Therefore, the transmission has to go through a mode shifting in order to configure for slow speed operation. As mentioned before, this shifting requires synchronizing gear sets. Although the shifting is continuous in speed, it is not continuous in torque and power.

Shifting between different modes presents an interesting challenge. It is often associated with a torque and a power interruption. Various means have been disclosed in prior art to perfect synchronizing mechanisms. To reduce torque interruption due to torque reversals in electric machines, Tenberge presented a means of using electronically controlled hydraulic clutch and brake packs to retain the torque balance and facilitate the mode shifting through differential engagement.

U.S. Pat. No. 6,203,468 illustrates a speed and torque control method to prevent speed and torque fluctuations during mode switching from series drive to parallel drive. The basic strategy is to match the speeds of the two electric machines and reduce the driving engine torque to zero at the switching point. Since the driving engine operating at switching point produces zero power, an on-board energy storage device is required for such system.

SUMMARY OF THE INVENTION

Among the several objects and advantages of the present invention are:

The provision of a simple, compact and low cost solution to continuously variable electro-mechanical vehicle power transmissions which eliminates internal power circulation and provides smooth, non-interruptive continuous shifting in speed, torque, and power between regime or mode changes;

The provision of a vehicle power electro-mechanical transmission which provides a high transmission efficiency over wide speed ratio range, from very low speed, down to vehicle stop, up to very high speed as in highway operation, and includes at least two mechanical link points where no power is passing from one external coupler to the other external coupler through the electric machines;

The provision of an electro-mechanical vehicle power transmission which, for the entire designed speed range, from reverse to zero output speed and to highway output speed, is capable of restricting the magnitude of power to electric machines below the input power levels, eliminating internal power circulation;

The provision of an electro-mechanical power transmission which blends a series-hybrid transmission configuration, a parallel-hybrid transmission configuration, a pure electric drive transmission, and a pure mechanical drive transmission over an entire speed range, leveraging the benefits of the series-hybrid configuration and pure electric drive transmissions during slow speed operation and the benefits of the parallel-hybrid configuration and pure mechanical drive transmissions at medium to high speed operation; and The provision of an electro-mechanical power transmission which is suitable for a having an input shaft and an output shaft mounted in a concentric configuration.

Briefly stated, the electro-mechanical vehicle power transmission of the present invention comprises two planetary trains, two electric machines, and at least one torque transfer device that can selectively connect one component to another component or components to transfer torque. Each planetary train has a ring member, a sun member, and a plurality of planets that are engaged with the ring member and the sun member. Each planetary train has a planet carrier that holds the planets in the annular space between the ring and the sun members. Each electric machine can be operated as a motor to covert electric energy to mechanical energy or as a generator to convert mechanic energy to electric energy. A first external couplers receives mechanical power from a prime mover while a second external coupler delivers mechanical power to a drive axle.

At least one member of the first planetary train is operatively connected to one of the electric machines, and at least one member of the first planetary train is operatively connected to one of the external couplers.

At least one member of the second planetary train is operatively connected one of the electric machines, and at least one member of the second planetary train is operatively connected to one of the external couplers.

At least one operative connection is provided between one member of the first planetary train and one member of the second planetary train. A second operative connection of a second member of the first planetary train to a second member of the second planetary train is selectively provided.

A brake is included which is configured to selectively hold at least one member of the planetary trains stationary.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

BEST MODE FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
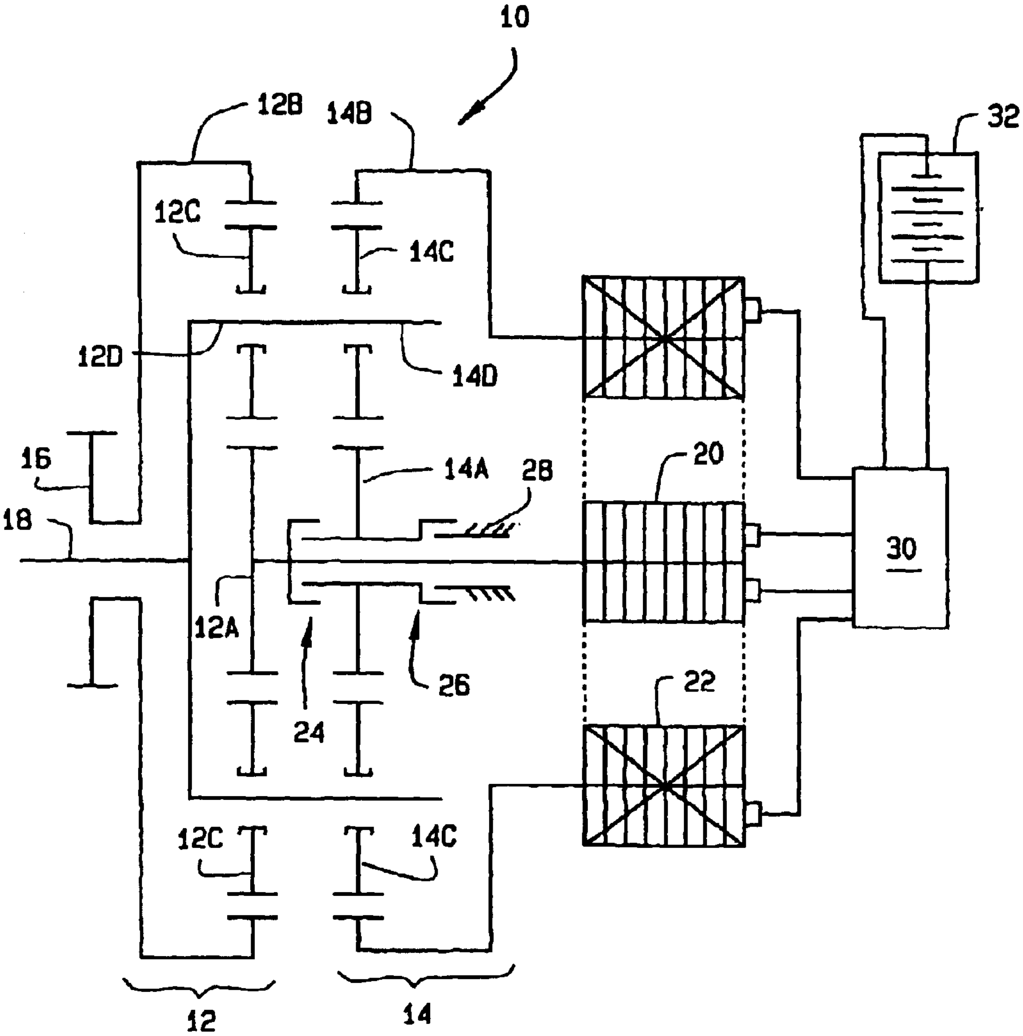
FIG. 1 is a representation of a first embodiment of an electro-mechanical hybrid power transmission of the present invention.

Referring to FIG. 1, an electro-mechanical hybrid transmission of the present invention is indicated generally at 10. The electro-mechanical hybrid transmission 10 comprises first planetary train, indicated generally at 12, and a second planetary train, indicated generally at 14.

Each planetary train includes a sun member 12A, 14A, a ring member 12B, 14B, a plurality of planet gears 12C, 14C, and a planet carrier 12D, 14D. The ratio of the pitch diameter of the ring member 12B, 14B to the pitch diameter of the sun member 12A, 14A for each planetary train is referred to as the planetary ratio. The planetary ratio of the first planetary train 12 is denoted as $K_1$ and the planetary ratio of the second planetary train is denoted as $K_2$.

A first external power coupler 16 (also referred to as an input shaft) is directly connected to the first ring member 12B and adapted to receive input mechanical power. A second external power coupler 18 (also referred to as an output shaft) is concentrically disposed relative to the input shaft 16, and is connected to the first planet carrier 12D and to the second planet carrier 14D to deliver output power to a driven component such as a drive axle or wheel. A first electric machine 20 is connected to the first sun member 12A, and a second electric machine 22 is concentrically disposed relative to the first electric machine 20, and is connected to the second ring member 14B.

A torque transfer device 24, such as locking clutch, selectively couples between the first sun member 12A of the first planetary train 12 and the second sun member 14A of the second planetary train 14, while a brake 26 selectively grounds the second sun member 14A of the second planetary train 14 to a ground (i.e. fixed), non-rotational member 28 of the electro-mechanical hybrid transmission 10.

The first electric machine 20 is connected to the second electric machine 22 through a power-regulating device 30 (also known as a power control unit) such that each electric machine 20, 22 can receive electrical power from, or deliver electrical power to, the other electric machine 20, 22. An energy storage device 32, such as a battery or capacitor may also be used so that each electric machine 20, 22 can receive electrical power and/or deliver electrical power to the energy storage device 32. In this sense, the electro-mechanical hybrid transmission 10 operates not only as a speed regulator similar to a conventional transmission, but also as a power regulator and power buffering device, for vehicle hybridization.

During operation, an internal combustion engine or a prime mover (not shown) is operatively connected to the input shaft 16 of the electro-mechanical transmission 10, and a final drive (now shown) is operatively connected to the output shaft 18.

Operating in a first state as a speed regulator only, all power received from the prime mover through the input shaft 16 is delivered to the output shaft 18 except for that lost to internal power losses.

During slow speed operation, clutch 24 is disengaged so that the first sun member 12A of the first planetary train 12 is disconnected from the second sun member 14A of the second planetary train 14. Brake 26 is engaged to ground the second sun member 14A, holding it stationary, such that the second planetary train 14 serves as a speed reduction device.

At start up, when a vehicle equipped with the electro-mechanical hybrid transmission 10 is stationary, no power is required, but launch torque is needed for the maximum acceleration of the vehicle. The driving engine delivers zero power by providing zero torque, while the launch torque required to hold or accelerate the vehicle is provided solely by the second electric machine 22 through the second planetary train 14 which serves as speed reduction gear. The motor torque delivered by the second electric machine 22 is amplified by a factor of $$\frac{M_{output}}{M_{motor2}} = 1 + \frac{1}{K_2}$$

at the output shaft 18, such that the motor torque is a fraction of the output torque, $$\frac{M_{motor2}}{M_{output}} = \frac{K_2}{1 + K_2}.$$

At this moment, the second electric machine 22 is stationary, consuming no power except internal loss. First electric machine 20 is in reverse rotation, and provides zero torque. The operational state of the electro-mechanical hybrid transmission 10 is considered as a series-hybrid since the second electric machine is supplying 100% of the launch torque as if there were no mechanical link from the driving engine to the vehicle wheels via the output shaft 18.

After start-up, as the vehicle accelerates and the kinetic energy builds, power to the output shaft 18 is required. The driving engine provides the power and, as a result, driving engine torque is increased (either by increasing a throttle opening under constant speed or by increasing driving engine speed under full throttle). To balance torque supplied by the driving engine, the torque of the first electric machine 20 is increased proportionally. The torque of the first motor is $$\frac{1}{K_1}$$

of the input torque from the driving engine.

The driving engine torque increases until the driving engine is operating at maximum torque or power. From hereon the driving engine operates at a constant speed and supplies a constant power level to the input shaft 16.

Figure 2:
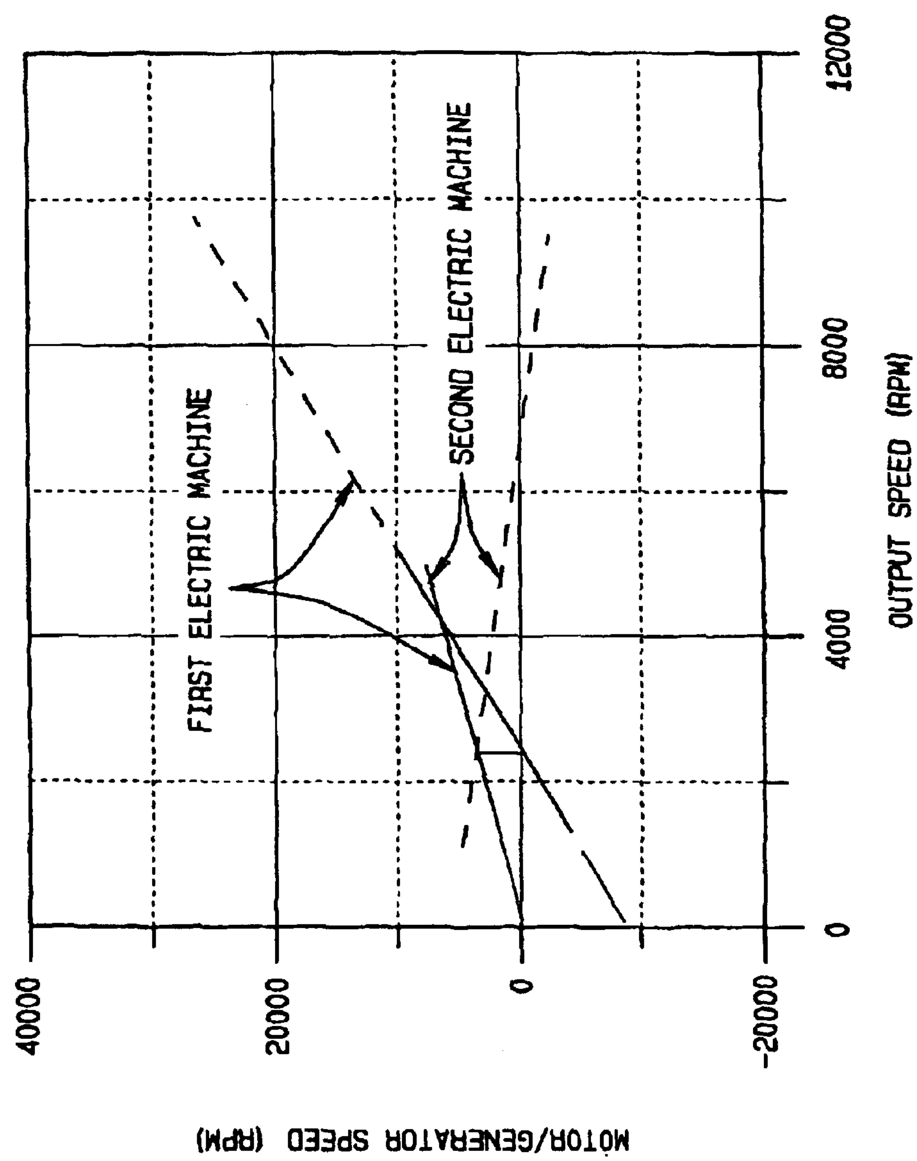
FIG. 2 is a graphical representation of motor/generator speed as a function of output speed under constant driving engine speed and power.
Figure 3:
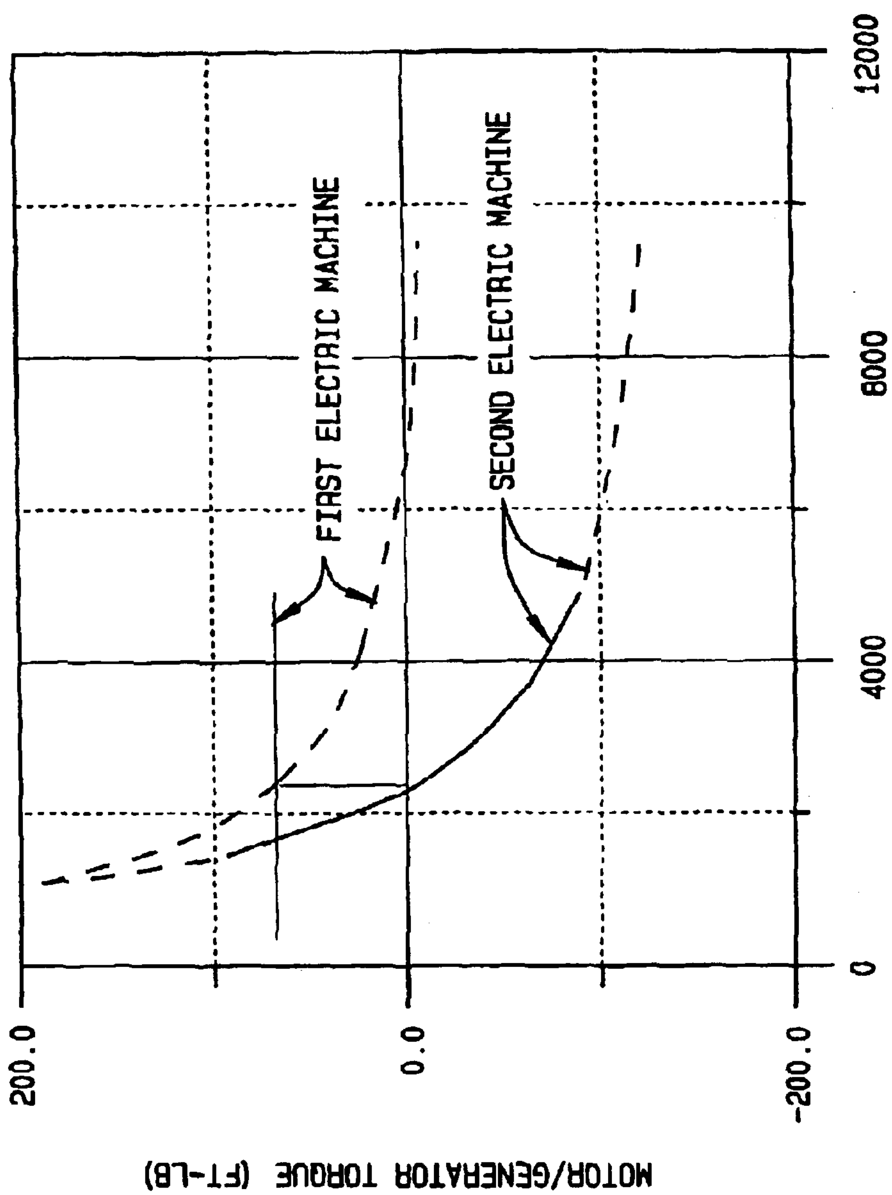
FIG. 3 is a graphical representation of motor/generator torque as a function of output speed under constant driving engine speed and power.
Figure 4:
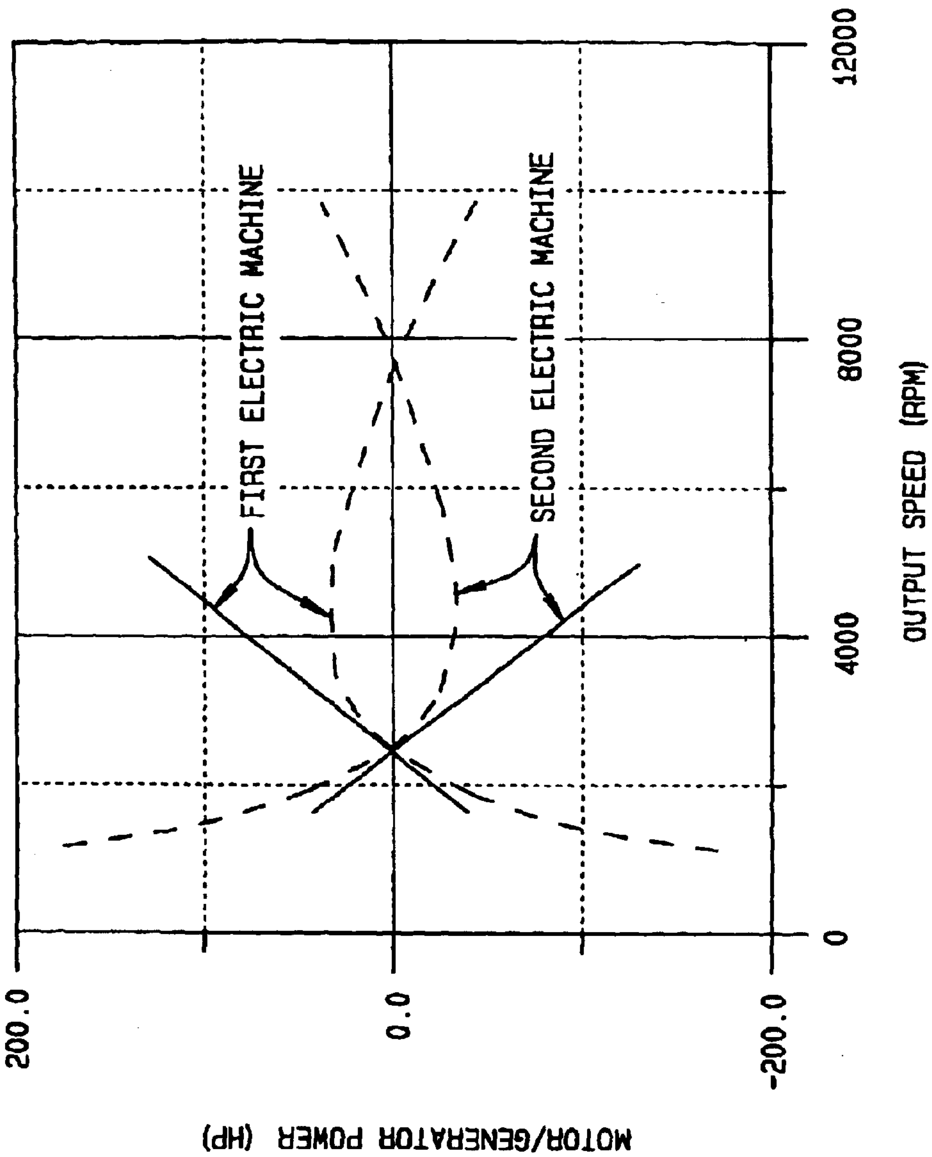
FIG. 4 is a graphical representation of motor/generator power as a function of output speed under constant driving engine speed and power.

After start-up, the torque load of the electro-mechanical hybrid transmission 10 is shared by the driving engine and the second electric machine 22. In this sense, the second electric machine 22 is operated as a motor and the first electric machine 20 is operated as a generator, supplying electric power to the second electric machine 22 through the power control unit 30. FIG. 2 through FIG. 4 illustrate speed, torque, and power of each electric machine 20, 22 as a function of the output shaft 18 speed when receiving a constant input torque and power level from the driving engine.

As the output speed (and correspondingly the vehicle speed) increases, the speed of the second electric machine 22 increases and the speed of first electric machine 20 decreases in magnitude until the first electric machine 20 comes to a standstill at a first node point. At this first node point, the second planetary train 14 is in a "free-wheeling" state, with no torque acting on any members of the second planetary train 14. Zero electric current in the second electric machine 22 further identifies this point. Therefore, no power is passing through either electric machine 20, 22. The first node point marks the end of the slow-speed operational mode or regime and the beginning of the high-speed operational mode or regime.

It can be shown that in the first regime where the output-to-input speed ratio is grater than zero and less than $$\frac{K_1}{K_1+1}, \text{ i.e. } 0 \le \frac{\omega_{out}}{\omega_{in}} \le \frac{K_1}{K_1+1},$$

the power that passes through the electric machines 20, 22, designated as $P_{electric}$, is proportional to the power that is being transmitted through the electro-mechanical hybrid transmission 10, designated as $P_{transmission}$. Assuming no net electric power is being drawn from or delivered to the electro-mechanical hybrid transmission 10, then this can be expressed as $$P_{electric} = \left[1 - \left(1 + \frac{1}{K_1}\right)\frac{\omega_{out}}{\omega_{in}}\right]P_{transmission}.$$

Therefore, the power $P_{electric}$ that passes through the electric machines 20, 22 is always less than the power $P_{transmission}$ that is being transmitted through the electro-mechanical hybrid transmission 10, (i.e. $P_{electric} \leqq P_{transmission}$). There is no internal power circulation between the electric machines 20, 22.

At the first node point, once the control unit determines that the vehicle is going to continue operation into a high-speed mode or regime, brake 26 is disengaged to release the second sun member 14A, and clutch 24 is engaged to couple between the first sun member 12A and the second sun member 14A. This results in each sun member 12A, 14A rotating together as a single unit. The regime transition is smooth in speed, torque, and power as indicated in FIG. 2 to FIG. 4. This is because both the first and second sun members 12A, 14A are initially at zero speed and the second planetary train 14 is momentarily in a free-wheeling state upon release of the brake 26.

As vehicle speed continues to increase, the torque of second electric machine 22 changes direction, and the speed of the second electric machine 22 decreases. The second electric machine 22 eventually transitions to a generator state, supplying electrical power through the power control unit 30 to the first electric machine 20. Concurrently, the rotational of the first electric machine 20 changes direction, and the torque of the first electric machine 20 starts to decrease. The first electric machine 20 eventually transitions to a motor state, receiving electrical power generated from the second electric machine 22.

Figure 5:
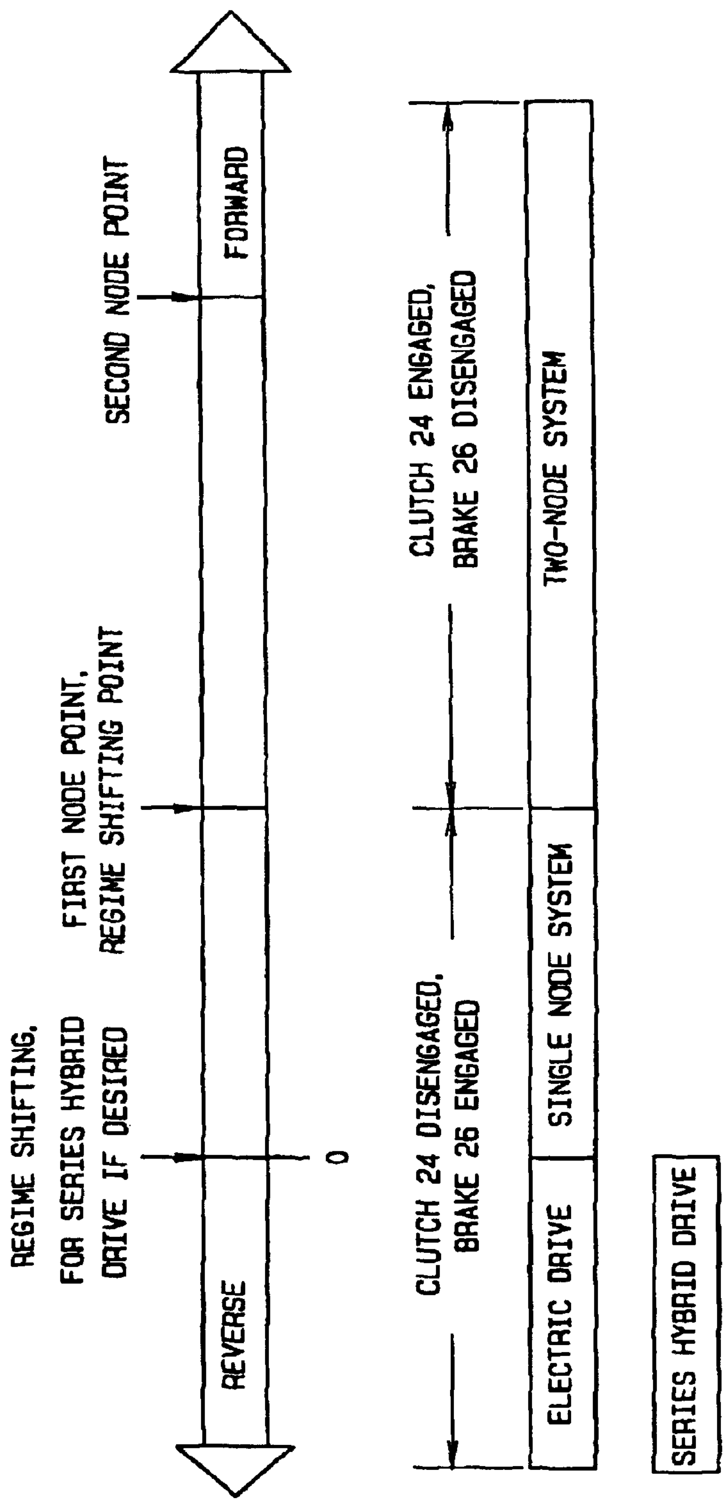
FIG. 5 is graphical representation of the operational regimes of the hybrid electro-mechanical power transmission of FIG. 1.

The speed of the second electric machine 22 and the torque of the first electric machine 20 continue to reduce as the vehicle speed further increases. Eventually, the second electric machine 22 comes to a standstill, at which point the torque of the first electric machine 20 is zero. This is a second node point at which no power passes through either electric machine 20, 22. FIG. 5 provides an overview of the different operating states or regimes over transmission speed ratio range, as well as the clutch and brake positions.

During operation between the first and the second node points, it can be shown that the power $P_{electric}$ to the electric machines is always less than the power $P_{transmission}$ that is being transmitted through the elector-mechanical hybrid transmission 10. In fact, the maximum power to the electric machines, $P_{max}$, is only a fraction of the transmission power $$P_{max} = \frac{\sqrt{\phi}-1}{\sqrt{\phi}+1}P_{transmission},$$

where $\phi$ is the nominal speed ratio range, defined as the ratio of the output-to-input speed ratios at the second node point to the first node point.

After passing the second node point as the vehicle speed further increases, the torque of the first electric machine 20 and the speed of the second electric machine 22 change their directions. Consequently, the first electric machine 20 operates as a generator again, supplying electric power to the second electric machine 22 through the power control unit 30. The second electric machine 22 operates as a motor, converting the electric power received from the first electric machine 20 into mechanical power to drive the output shaft 18.

During reverse operation, the electro-mechanical hybrid transmission 10 can operate in a number of possible modes. Assuming there is an on-board energy storage device 32 such as a battery, the vehicle can operate in reverse in a pure electrical mode. As in the slow-speed operation mode, the clutch 24 is disengaged to uncouple the first sun member 12A from the second sun member 14A, and brake 26 is engaged to ground the second sun member 14A.

When the power control unit 30 determines the vehicle is transitioning to reverse operation, the first electric machine 20 is switched off and is left in a free-wheeling state (this can be achieved, for instance, by using switch reluctant motors). Power from the storage device 32 is channeled to the second electric machine 22, which is now solely powering the vehicle through the output shaft 18, in a reverse direction. In this mode, the driving engine can either be shut off or remain in an idle state, supplying no power or torque to the input shaft 16.

It is also possible to reverse the vehicle with the electro-mechanical hybrid transmission 10 in a series-hybrid mode without drawing power from energy storage device 32. All power supplied comes directly from the driving engine through a series configuration (engine to generator to motor to wheel). In this case, the energy storage device 32 may or may not be necessary. This mode of operation can be achieved by the alternate embodiment shown in FIG. 8 and described below.

Figure 6:
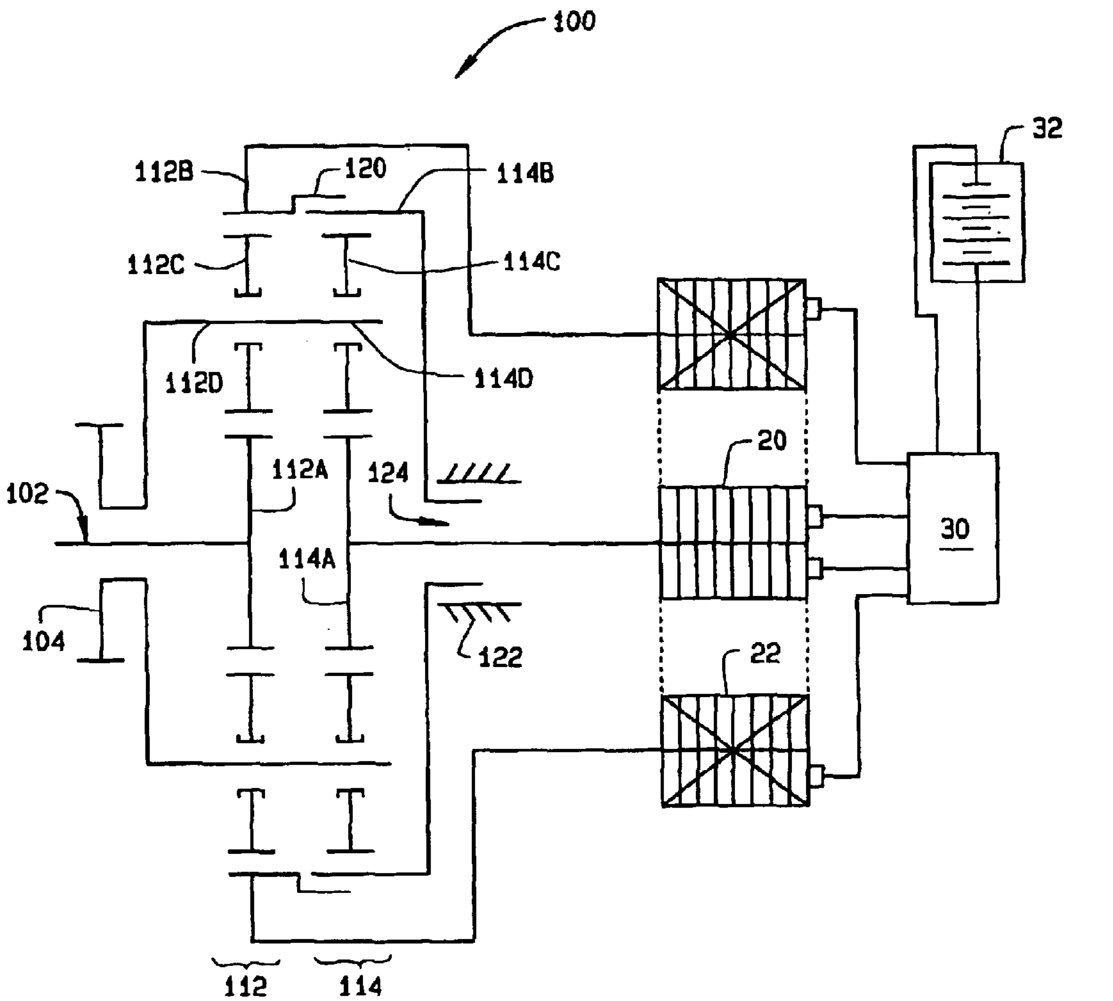
FIG. 6 is a representation of an alternate embodiment of an electro-mechanical hybrid power transmission of the present invention.

Referring to FIG. 6, there is shown an alternate embodiment 100 of the transmission of the present invention. The alternate embodiment 100 is a direct derivative of the embodiment shown in FIG. 1, and includes two planetary trains 112, 114. Each planetary train includes a sun member 112A, 114A, a ring member 112B, 114B, a plurality of planet gears 112C, 114C, and a planet carrier 112D, 114D. Unlike the first embodiment, a power input shaft 102 is connected to the first sun member 112A of the first planetary train 112, and a power output 104 is coupled to the planet carrier 112D.

The first electric machine 20 is connected to the second sun member 114A of the second planetary train 114. The second electric machine 22 is connected to the first ring member 112B of the first planetary train 112. The second ring member 114B of the second planetary train 114 is selectively connected to the first ring member 112B of the first planetary train 112 through a clutch 120 or grounded to a ground (fixed or non-rotating) member 122 by a brake 124.

With additional clutches and brakes, the functionality of the basic embodiments can be enhanced. Such enhancements are shown in two additional embodiments shown in FIG. 7 and FIG. 8, described below.

Figure 7:
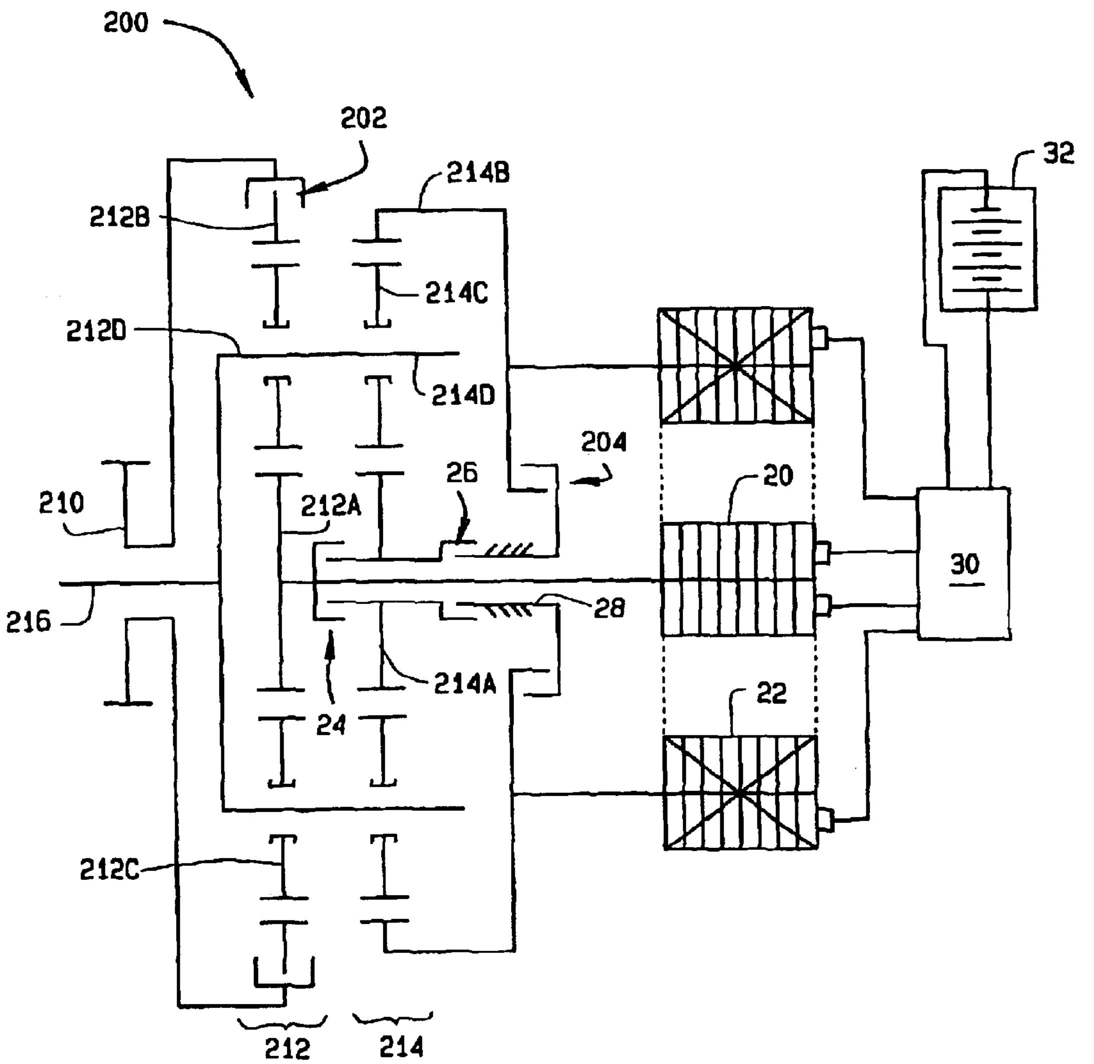
FIG. 7 is a representation of a second alternate embodiment of an electro-mechanical hybrid power transmission of the present invention.

FIG. 7 shows an embodiment 200 which is a derivative of the embodiment shown in FIG. 1 including two planetary trains 212, 214. Each planetary train includes a sun member 212A, 214A, a ring member 212B, 214B, a plurality of planet gears 212C, 214C, and a planet carrier 212D, 214D. A second clutch 202 and a second brake 204 are added to the electro-mechanical hybrid transmission 200. The brake 204 can be used to ground the second ring member 214B of the second planetary train 214 when the second electric machine 22 comes to a standstill, and can be used in conjunction with brake 26 to provide a parking function. Clutch 202 is used to disconnect the input shaft 210 from the first ring member 212B of the first planetary train 212 when both electric machines 20, 22 are required to power the vehicle for maximum power through the output shaft 216 in a pure electric drive mode.

Figure 8:
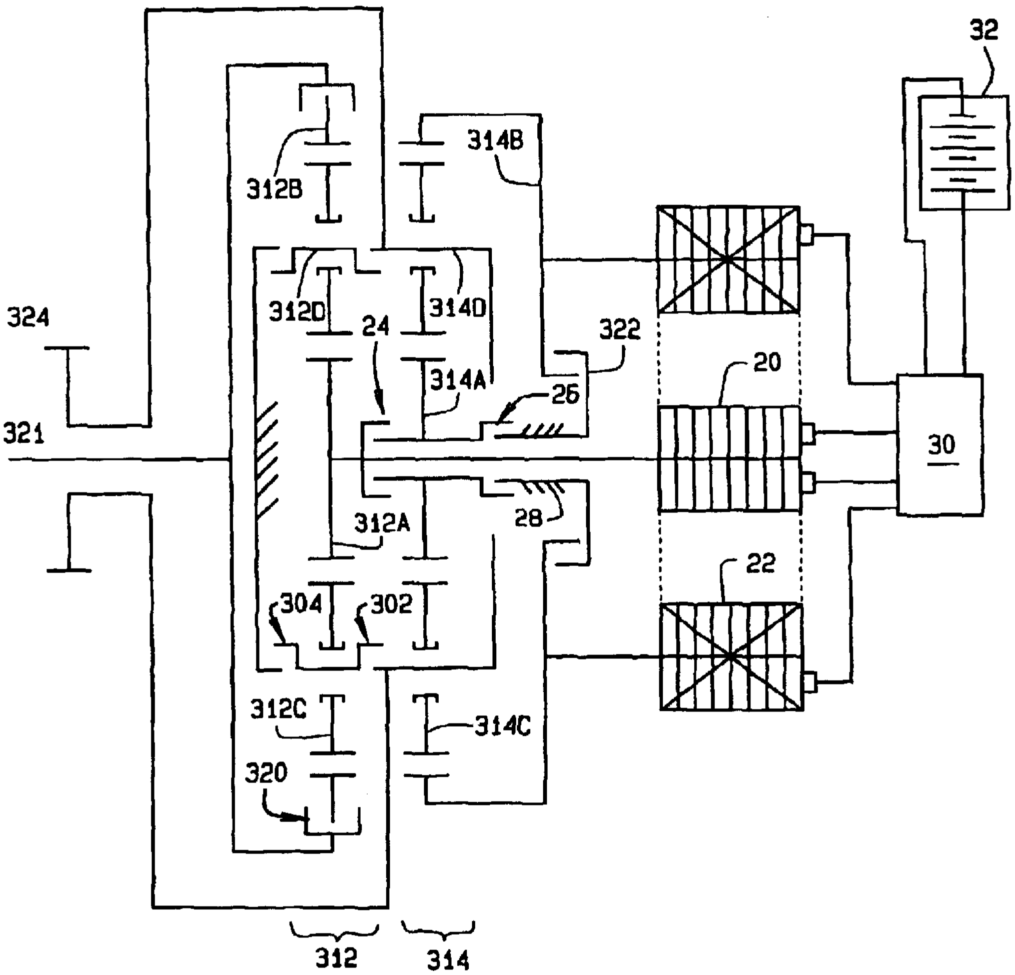
FIG. 8 is a representation of a third alternate embodiment of an electro-mechanical hybrid power transmission of the present invention.

FIG. 8 shows another embodiment 300 of the present invention which is a derivative of the embodiment shown in FIG. 7 including two planetary trains 312, 314. Each planetary train includes a sun member 312A, 314A, a ring member 312B, 314B, a plurality of planet gears 312C, 314C, and a planet carrier 312D, 314D. Compared with alternate embodiment 200, a third clutch 302 and a third brake 304 are added. Clutch 302 is used to selectively connect the first planet carrier 312D of the first planetary train 312 to the second planet carrier 314D of the second planetary train 314. The brake 304 is used to ground the first planet carrier 312D of the first planetary train 312 when directed by the control unit 30.

With the addition of clutch 302 and brake 304, it is possible to operate the transmission 300 in series-hybrid configuration over a wide speed range. In series configuration, clutch 320 is engaged, connecting the input shaft 321 to the first ring member 312B. Brake 304 is engaged to ground the first planet carrier member 312D. Clutch 302 is disengaged to disconnect the first carrier member 312D of the first planetary train 312 from the second planet carrier member 314D of the second planetary train 314. Clutch 24 is also disengaged to 20, disconnect the first sun member 312A of the first planetary train 312 from the second sun member 314A of the second planetary train 314. Brake 26 is engaged to ground the second sun member 314A of the second planetary train 314. The two planetary trains 312 and 314 are de-attached from each other. The first planetary train 312 functions as a speed increaser from the input shaft 321 to the first electric machine 20. The second planetary train 314 functions as a speed reducer from the second electric motor 22 to the output shaft 324.

The mechanical power received through input shaft 321 from the driving engine drives the first electric machine 20 through the first planetary train 312. The first electric machine 20 in turn generates electric power to power the second electric machine 22 through the power control unit 30. The second electric machine 22 then delivers power to the output shaft 324 through the second planetary train 314.

Although the series-hybrid configuration can operate over a wide speed range from reverse to forward, it shows distinct advantages when operated in reverse mode by avoiding internal power circulation. The transition from forward to reverse, or vice versa, can be made smooth in speed, torque and power. At zero vehicle speed, the first and second carrier members 312D and 314D in both planetary trains 312, 314 are stationary. The first planetary train 312 is at free-wheeling state, and no torque is acting on the first planet carrier 312D.

The term "electric machine" as used throughout this disclosure refers to any type of electric motor and generator, as well as to any type of gearheaded motors which contain a gear set and a motor.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An electro-mechanical vehicle power transmission comprising:

no more than a pair of planetary trains, each of said pair of planetary train having a ring member, a sun member, a plurality of planet members engaged with said ring member and said sun member, and a planet carrier configured to hold said planets in an annular space between said ring and said sun members;

a pair of electric machines;

a power control unit electrically coupled to each electric machine in said pair of electric machines; and at least one torque transfer device that can selectively couple one or more members of a first planetary train of said pair of planetary trains to one or more members of a second planetary train of said pair of planetary trains to transfer torque.

2. The electro-mechanical vehicle power transmission of claim 1 wherein each of said pair of electric machines includes a motor operational state to covert electric energy to mechanical energy and a generator operation state to convert mechanic energy to electric energy.

3. The electro-mechanical vehicle power transmission of claim 1 further including a pair of external power couplers, a first of said external power couplers configured to receive mechanical power from a prime mover; and a second of said external power couplers configured to deliver mechanical power to a driven member.

4. The electro-mechanical vehicle power transmission of claim 3 including at least one member of a first planetary train of said pair of planetary trains operatively connected to one of said pair of electric machines; and at least one member of said first planetary train operatively connected to one of said external couplers.

5. The electro-mechanical vehicle power transmission of claim 4 including at least one member of a second planetary train of said pair of planetary trains operatively connected one of the electric machines; and at least one member of said second planetary train operatively connected to one of said external couplers.

6. The electro-mechanical vehicle power transmission of claim 1 including one or more operative connections between each planetary train of said pair of planetary trains.

7. The electro-mechanical vehicle power transmission of claim 1 including a brake configured to selectively hold at least one member of said pair of planetary trains stationary.

8. The electro-mechanical vehicle power transmission of claim 1 wherein a first electric machine in said pair of electric machines is coupled to a sun member of a first planetary train in said pair of planetary trains; and a second electric machine in said pair of electric machines is coupled to a ring member of a second planetary train in said pair of planetary trains.

9. The electro-mechanical vehicle power transmission of claim 1 wherein said torque transfer device comprises a clutch, said clutch selectively coupled between a first sun member of a first planetary train in said pair of planetary trains to a second sun member of a second of planetary train in said pair of planetary trains; and further including a brake selectively coupled between said second sun member and a ground component.

10. The electro-mechanical vehicle power transmission of claim 9 further including a second clutch, said second clutch selectively coupling a ring member of said first planetary train to an external power coupler; and a second brake, said second brake selectively coupled between a second ring member of said second planetary train and said ground component.

11. The electro-mechanical vehicle power transmission of claim 10 further including a third clutch, said third clutch selectively coupling a first planet carrier of said first planetary train in said pair of planetary trains to a second planet carrier of said second planetary train in said pair of planetary trains; and a third brake, said third brake selectively coupled between said first planet carrier and said ground component.

12. The electro-mechanical vehicle power transmission of claim 1 wherein said torque transfer device comprises a clutch, said clutch selectively coupled between a first ring member of a first planetary train in said pair of planetary trains to a second ring member of a second of planetary train in said pair of planetary trains; and further including a brake selectively coupled between said second ring member and a ground component.

13. An electro-mechanical vehicle power transmission comprising:

no more than a pair of planetary trains, each of said pair of planetary train having a ring member, a sun member, a plurality of planet members engaged with said ring member and said sun member, and a planet carrier configured to hold said planets in an annular space between said ring and said sun members;

a pair of electric machines;

a power control unit electrically coupled to each electric machine in said pair of electric machines;

at least one torque transfer device that can selectively couple one or more members if a first planetary train of said pair of planetary trains to one or more members of a second planetary train of said pair of planetary trains to transfer torque; and wherein said torque transfer device comprises a clutch, said torque transfer device operatively coupling a first ring member of a first planetary train in said pair of planetary trains to a second ring member of a second planetary train in said pair of planetary trains.

14. A method for delivering power from a prime mover to a driven component through a electro-mechanical hybrid transmission having no more than a pair of planetary gear trains coupled between a input shaft and an output shaft, a pair of electric machines coupled to said planetary gear trains, and at least one torque transfer device selectively coupling a first ring member of a first planetary train in said pair of planetary trains to a second ring member of a second planetary train in said pair of planetary trains, comprising:

selectively routing through at least one planetary train in said pair of planetary trains a portion of mechanical power received from said prime mover to drive said driven component at a desired rotational speed;

during a first operational state:

decoupling said first ring member of said first planetary train in said pair of planetary trains from said ring member in said second planetary train in said pair of planetary trains at said torque transfer device;

converting a portion of mechanical power received from said driving engine into electrical power utilizing a first of said pair of electric machines;

routing said electrical power between said first of said pair of electric machines and a second of said pair of electric machines;

utilizing said electric power to drive said second of said pair of electric machines to provide mechanical power at said driven component through said pair of planetary trains;

during a second operational state:

coupling said first ring member in said first planetary train in said pair of planetary trains to said second ring member in said second planetary train in said pair of planetary trains at said torque transfer device;

converting a portion of mechanical power received from said driving engine into electrical power utilizing said pair of electric machines;

routing said electrical power between said second of said pair of electric machines and said first of said pair of electric machines;

utilizing said electric power to drive said first of said pair of electric machines to provide mechanical power at said driven component through said pair of planetary trains; and during a third operational state:

coupling said first ring member in said first planetary train in said pair of planetary trains to said second ring member in said second planetary train in said pair of planetary trains at said torque transfer device;

converting a portion of mechanical power received from said driving engine into electrical power utilizing said first of said pair of electric machines;

routing said electrical power between said first of said pair of electric machines and said second of said pair of electric machines;

utilizing said electric power to drive said second of said pair of electric machines to provide mechanical power at said driven component through said pair of planetary trains.

15. The method of claim 14 for delivering power from a prime mover to a driven component further including the steps of:

operating said electro-mechanical hybrid transmission in said first operational state below a first predetermined output-to-input speed ratio of said transmission;

operating said electro-mechanical hybrid transmission in said second operational state between said first predetermined speed ratio of said transmission and a second predetermined output-to-input speed ratio of said transmission; and operating said electro-mechanical hybrid transmission in said third operational state above said second predetermined speed ratio of said transmission.

16. The method of claim 14 for delivering power from a prime mover to a driven component further including smoothly transitioning between said first, second, and third operational states.

* * * * *